(12) United States Patent
Liu et al.

(10) Patent No.: US 8,467,480 B2
(45) Date of Patent: Jun. 18, 2013

(54) COMBINING DECISION METRICS FOR DECODING BASED ON PAYLOAD DIFFERENCE

(75) Inventors: Ke Liu, San Diego, CA (US); Kibeom Seong, West New York, NJ (US); Tao Luo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 12/878,906

(22) Filed: Sep. 9, 2010

(65) Prior Publication Data

US 2011/0228883 A1 Sep. 22, 2011

Related U.S. Application Data

(60) Provisional application No. 61/242,307, filed on Sep. 14, 2009.

(51) Int. Cl.
*H03D 1/00* (2006.01)
*H04L 27/06* (2006.01)

(52) U.S. Cl.
USPC ........................................................ 375/340

(58) Field of Classification Search
USPC ................ 375/340–341, 262; 714/746, 758, 714/794–796
See application file for complete search history.

(56) References Cited

U.S. PATENT DOCUMENTS

| | | | | |
|---|---|---|---|---|
| 6,654,926 B1 * | 11/2003 | Raphaeli et al. | ............... | 714/780 |
| 7,302,019 B2 * | 11/2007 | Ide | ................................ | 375/341 |
| 7,623,597 B2 * | 11/2009 | Yu et al. | ........................ | 375/340 |
| 8,107,542 B1 * | 1/2012 | Lou et al. | ....................... | 375/259 |
| 2008/0049877 A1 * | 2/2008 | Yu et al. | ........................ | 375/340 |
| 2009/0323846 A1 * | 12/2009 | Sindhushayana | ............. | 375/262 |
| 2010/0272220 A1 * | 10/2010 | Murai et al. | .................. | 375/346 |

OTHER PUBLICATIONS

International Search Report and Written Opinion—PCT/US2010/048673, International Search Authority—European Patent Offic—Nov. 30, 2010.
Narayanan, Krishna, "A Novel ARQ Technique Using the Turbo Coding Principal" IEEE Communications Letter 1(2):49-51 (Mar. 1997), XP011010498.

* cited by examiner

*Primary Examiner* — Jean B Corrielus
(74) *Attorney, Agent, or Firm* — Nerrie M. Zohn

(57) ABSTRACT

Decision metrics used to decode wireless communication payloads are combined for successive frames to improve decoding of the later received frames. A bitwise payload difference between successive frames is encoded in the same manner the payloads are encoded. Decision metrics determined for the earlier received frame are combined with the encoded payload difference to generate adjusted decision metrics. The adjusted decision metrics are combined with decision metrics determined for the later received frame. The combined decision metrics are decoded to generate a payload for the later received frame. If the decoding is not successful the combined decision metrics are carried forward and the process is repeated based on the payload difference between the following frames.

29 Claims, 7 Drawing Sheets

COMBINING DECISION METRICS FOR DECODING BASED ON PAYLOAD DIFFERENCE

CROSS-REFERENCE TO RELATED APPLICATION

This application claims the benefit of U.S. Provisional Patent Application No. 61/242,307, entitled "METHOD AND APPARATUS FOR COMBINING DECISION METRICS FOR DECODING BASED ON PAYLOAD DIFFERENCE," filed on Sep. 14, 2009, the disclosure of which is expressly incorporated by reference herein in its entirety.

BACKGROUND

1. Field

Aspects of the present disclosure relate generally to wireless communication systems, and more particularly, to techniques for decoding in wireless communication systems.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or evolved node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining first decision metrics for a first frame carrying a first payload, determining second decision metrics for a second frame carrying a second payload, and determining payload difference between the second payload and the first payload. The method combines the first and second decision metrics based on the payload difference to obtain combined decision metrics; and decodes the combined decision metrics to obtain a decoded second payload.

In an additional aspect of the disclosure, an apparatus for wireless communication includes means for determining first decision metrics for a first frame carrying a first payload, means for determining second decision metrics for a second frame carrying a second payload, and means for determining a payload difference between the second payload and the first payload. The apparatus also includes means for combining the first and second decision metrics based on the payload difference to obtain combined decision metrics; and means for decoding the combined decision metrics to obtain a decoded second payload.

In an additional aspect of the disclosure, a computer program product has a computer-readable medium having program code recorded thereon. This program code includes code to determine first decision metrics for a first frame carrying a first payload, code to determine second decision metrics for a second frame carrying a second payload, and code to determine a payload difference between the second payload and the first payload. The program code also includes code to combine the first and second decision metrics based on the payload difference to obtain combined decision metrics, and code to decode the combined decision metrics to obtain a decoded second payload.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
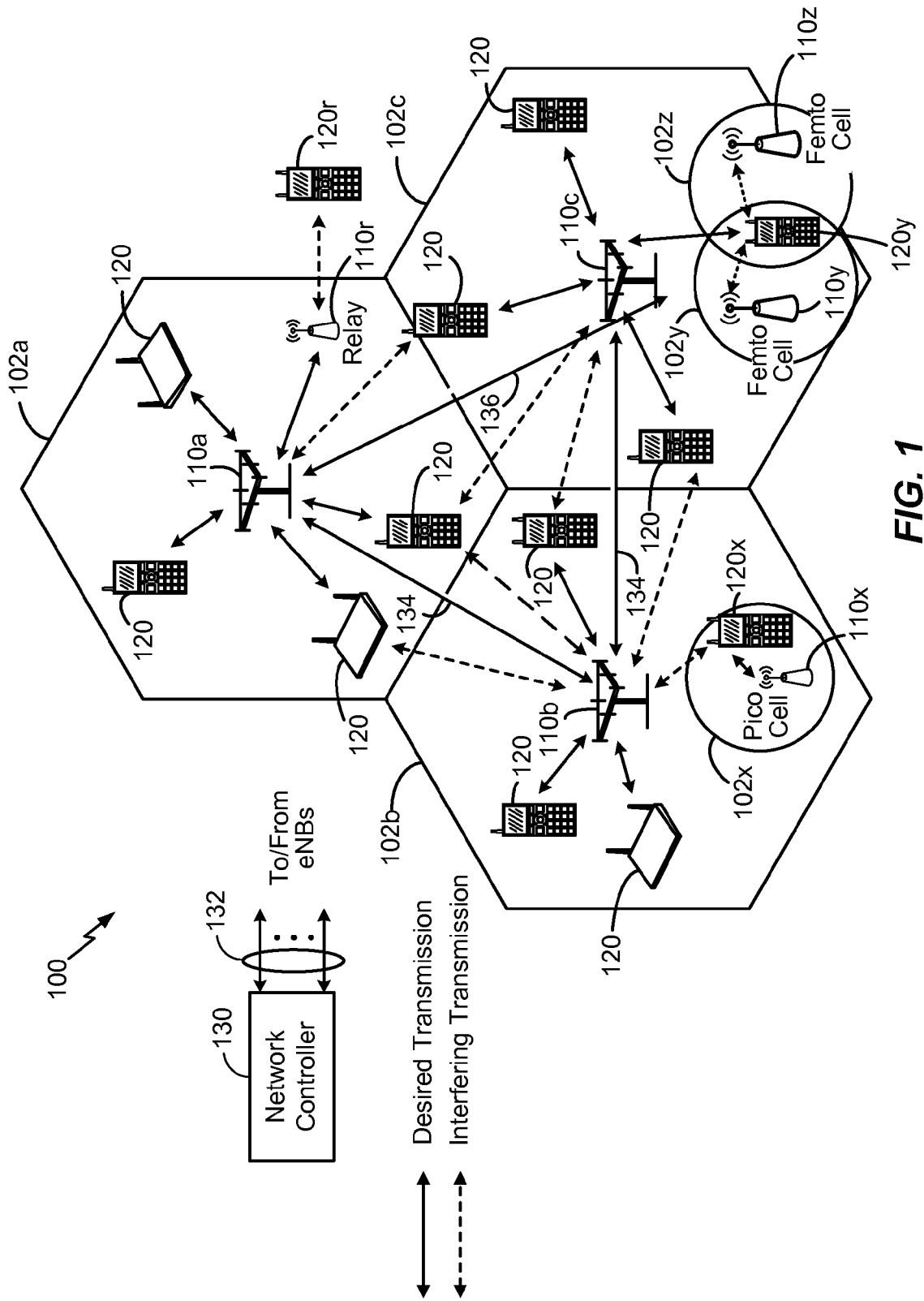
FIG. 1 is a block diagram conceptually illustrating an example of a mobile communication system.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
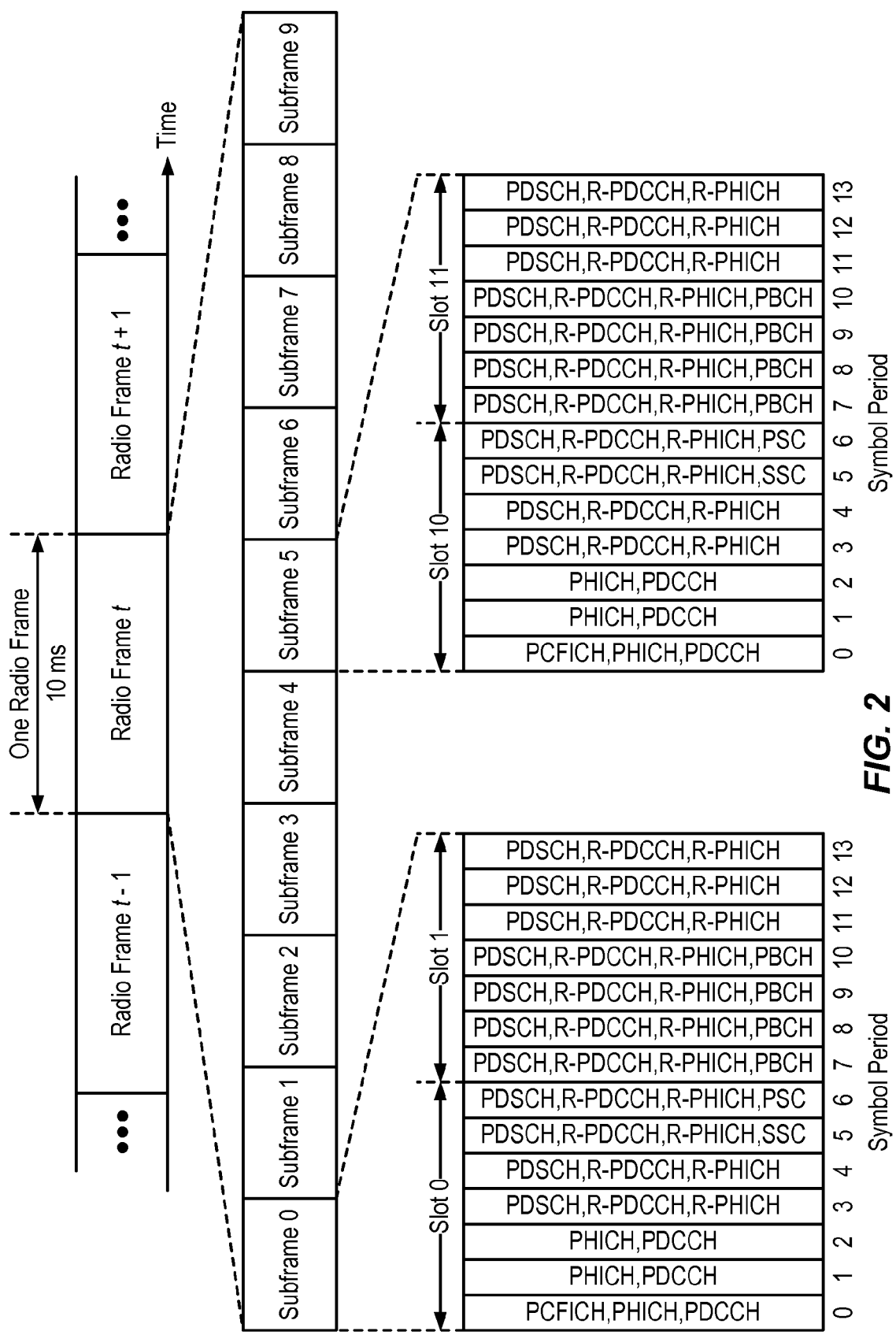
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information, as discussed in further detail below.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
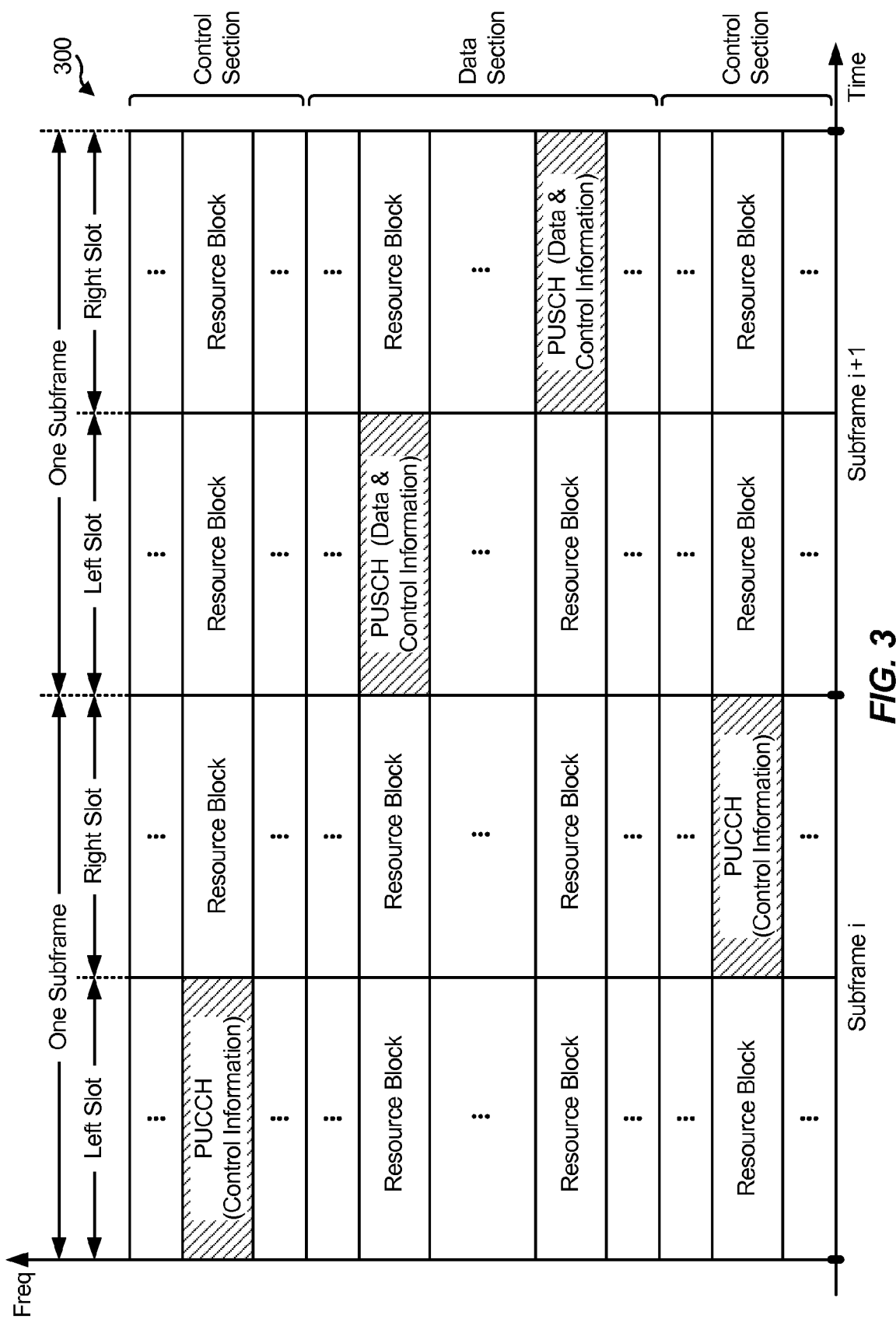
FIG. 3 is a block diagram conceptually illustrating an exemplary frame structure in uplink LTE/-A communications.

FIG. 3 is a block diagram 300 conceptually illustrating an exemplary frame structure in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

The PSS, SSS, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, as provided in the LTE Release 8 standard, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like. However, there are some cases when interference cancellation is not desirable.

Figure 4:
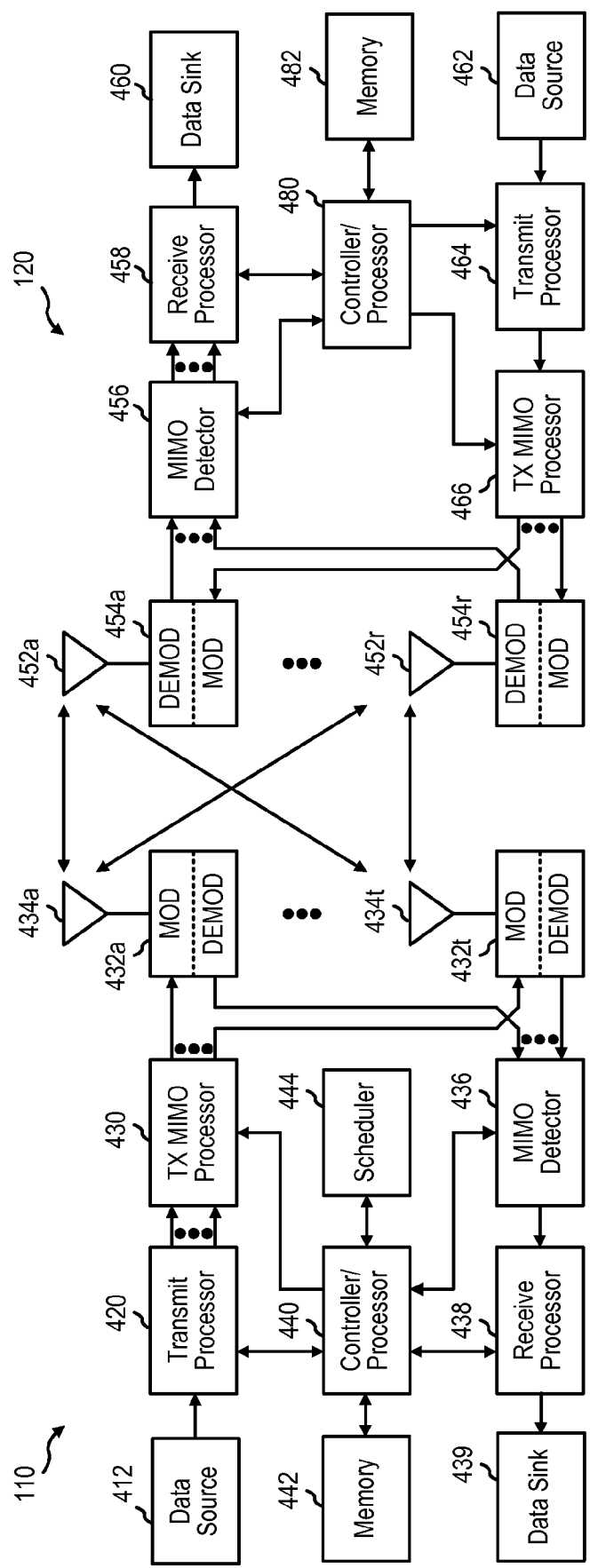
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples.

Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGS. 4 and 5, and/or other processes for the techniques described herein. The memories 442 and 482 may store data and program codes for the base station 110 and the UE 120, respectively. A scheduler 444 may schedule UEs for data transmission on the downlink and/or uplink.

The techniques described herein may be used to decode various types of transmissions sent on the downlink and uplink, for example, when interference cancellation is not employed, and a low signal to noise ratio (SNR) exists. For clarity, much of the description below is for a Physical Broadcast Channel (PBCH) in LTE, although any known payload or payload having a predictable variation (e.g., deterministic variation) can be processed according to the disclosure.

Figure 5:
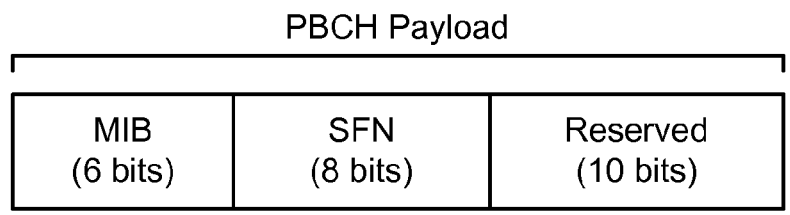
FIG. 5 is a block diagram conceptually illustrating an exemplary payload for a PBCH according to one aspect of the present disclosure.

FIG. 5 shows an exemplary payload for each PBCH transmission. The PBCH payload includes a 6-bit Master Information Block (MIB), an 8-bit System Frame Number (SFN), and 10 reserved bits. The eNB may increment a 10-bit SFN by one in each 10 ms radio frame. The eNB transmits the PBCH periodically, e.g., every four radio frames and may use the eight most significant bits of the 10-bit SFN as the 8-bit SFN. The 8-bit SFN is incremented by one for each PBCH transmission. The MIB includes information that is semi-static, changing infrequently. Thus, redundant information is frequently re-sent. The reserved bits are set to fixed values (e.g., all zeros). Alternatively, one or more reserved bits may be used to convey information, which may be semi-static or dynamic.

In general, the PBCH payload may include any number of fields, and each field can carry any type of information and may be of any size. The information in each field may be semi-static or dynamic. The information in a given field may also change in a deterministic manner, e.g., incremented by one in the case of the 8-bit SFN.

Figure 6:
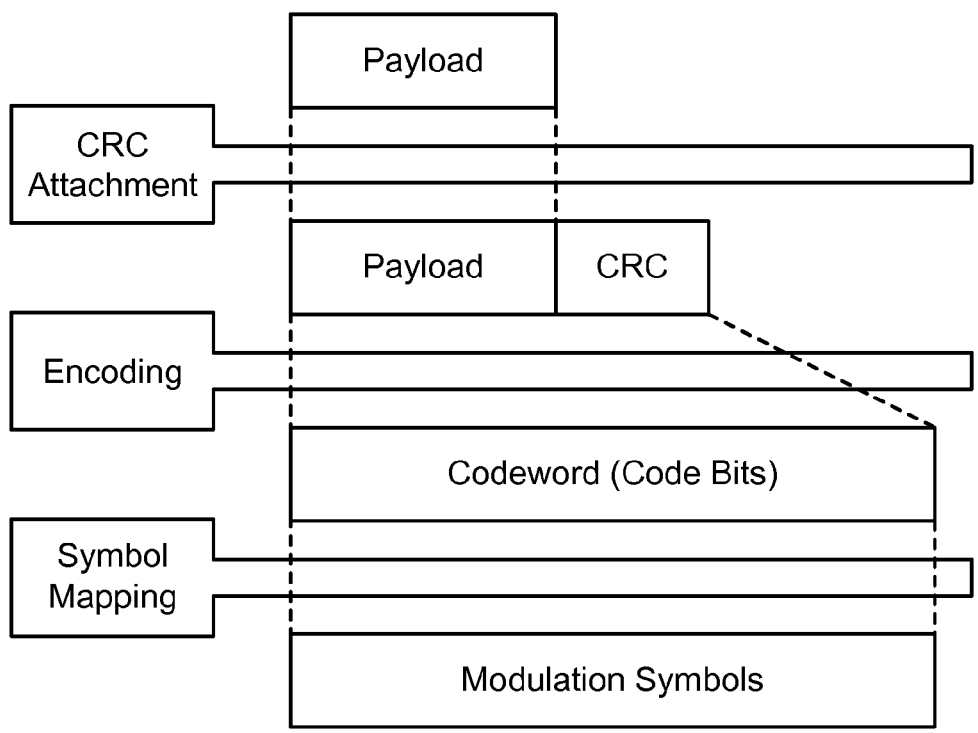
FIG. 6 is a block diagram conceptually illustrating processing at an eNB for a PBCH transmission according to one aspect of the present disclosure.

FIG. 6 shows processing at the eNB for a PBCH transmission. In general, the PBCH payload may be processed with any combination of error detection code (e.g., CRC) and error correction code (e.g., tail biting convolutional code TBCC). In the illustrative embodiment, a PBCH payload is attached with a cyclic redundancy check (CRC) to obtain a data block. The CRC may be generated across the entire PBCH payload and may be 16 bits in LTE. The data block is the 24-bit payload and the 16-bit CRC and thus includes 40 data bits. The data block may be encoded with a rate 1/3 tail biting convolutional code (TBCC) to obtain a codeword of 120 code bits. The 120 code bits may be mapped to QPSK modulation symbols, which is further processed and transmitted in a PBCH transmission to UEs.

A UE receives a PBCH transmission from the eNB and attempts to decode the received PBCH transmission. The UE may be able to correctly decode the received PBCH transmission if the channel conditions observed by the UE are not too poor. In certain scenarios, the UE is not be able to correctly decode the received PBCH transmission, and the CRC check would fail. The UE then receives the next PBCH transmission from the eNB and may again attempt to decode this received PBCH transmission. The UE may also not be able to correctly decode this received PBCH transmission if the channel conditions are poor, e.g., due to high interference.

In an aspect, the UE combines decision metrics for multiple received PBCH transmissions whenever a received PBCH transmission is decoded in error. The UE may combine the decision metrics based on the difference between PBCH payloads, as described below. The UE may then decode the combined decision metrics instead of the decision metrics for each PBCH transmission. The combined decision metrics have more energy and may also provide time diversity. Consequently, the UE may be able to correctly decode the combined decision metrics even in poor channel conditions.

Figure 7:
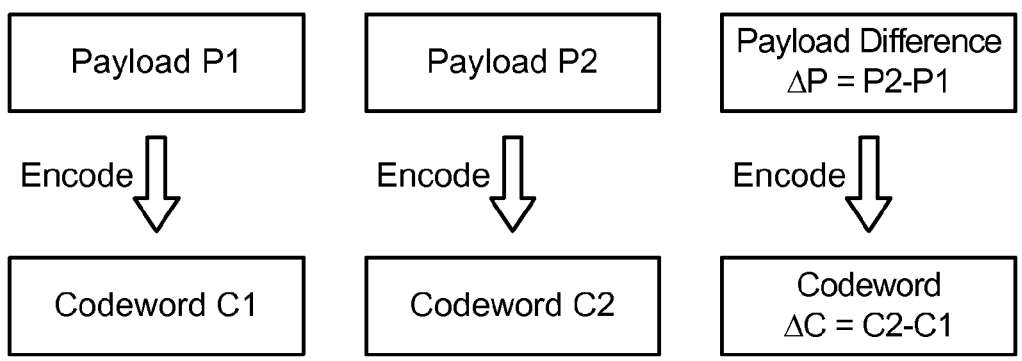
FIG. 7 is a block diagram conceptually illustrating characteristic of a linear code according to one aspect of the present disclosure.

FIG. 7 illustrates a characteristic of a linear code, such as a CRC or a TBCC. A first payload P1 is encoded with the linear code to obtain a first codeword C1. A second payload P2 is also encoded with the same linear code to obtain a second codeword C2. The difference between the second payload and the first payload is computed and denoted as $\Delta P = P2 - P1$. The payload difference is encoded with the same linear code to obtain a third codeword $\Delta C = C2 - C1$. The third codeword is the difference between the second codeword C2 and the first codeword C1.

As shown in FIG. 7, two payloads may be encoded separately with the linear code to obtain two codewords. For a linear code, the sum or difference of the two codewords is equal to a codeword obtained by encoding the sum or difference of the two payloads with the same linear code. This characteristic of the linear code may be exploited to combine decision metrics for different PBCH transmissions, as described below.

Figure 8:
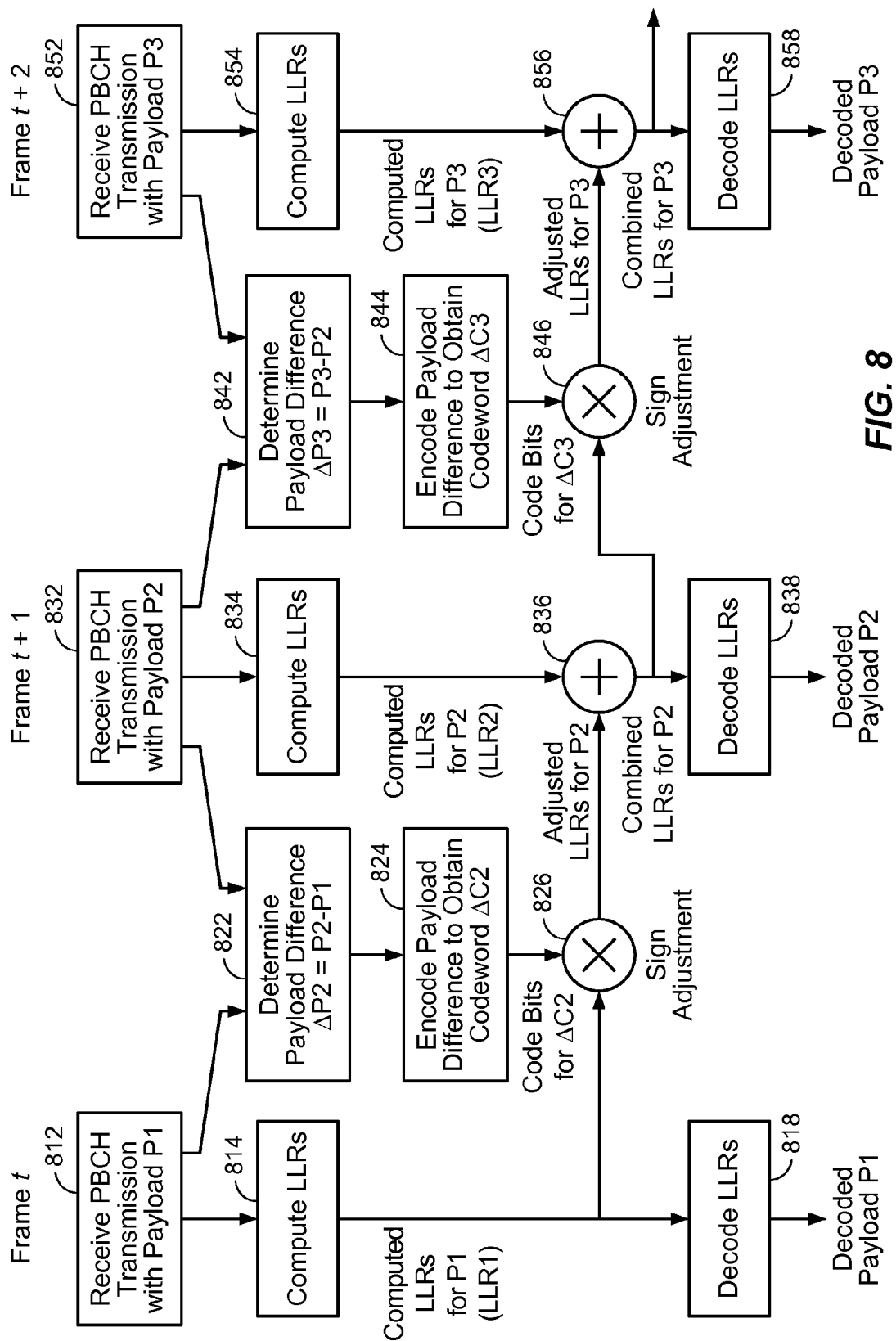
FIG. 8 is a block diagram conceptually illustrating decoding PBCH transmissions with decision metric combining according to one aspect of the present disclosure.

FIG. 8 shows an exemplary design of decoding PBCH transmissions with decision metric combining to improve decoding performance. A UE receives a PBCH transmission with payload P1 (e.g., MIB) in frame t (block 812). The UE computes log-likelihood ratios (LLRs) for code bits for payload P1 based on the received PBCH transmission (block 814). LLRs are commonly used as soft decision metrics for decoding. Other types of decision metrics may also be used for decoding. The UE may obtain 120 LLRs for the 120 code bits for payload P1, one LLR for each code bit, and then store the LLRs. The LLRs for payload P1 are denoted as LLR1. The UE decodes the LLRs to obtain a decoded payload P1 (block 818). The UE may perform a CRC check to determine whether payload P1 is decoded correctly. If the answer is yes, then the UE terminates the decoding of the PBCH. If the PBCH transmission in frame t is decoded in error, then the UE may store LLR1 to improve decoding of the next PBCH transmission(s) as described below.

The UE receives a PBCH transmission with payload P2 (e.g., MIB) in frame t+1 (block 832). The UE may compute LLRs for code bits for payload P2 based on the received PBCH transmission (block 834). The LLRs for payload P2 are denoted as LLR2. The UE determines the binary difference (i.e., XOR) between payload P2 and payload P1, which may be denoted as $\Delta P2$ (block 822). The UE encodes the payload difference $\Delta P2$ in the same manner as performed by the eNB for a PBCH payload to obtain a codeword having 120 code bits for the payload difference (block 824). For example, the UE may generate a CRC for the payload difference and encode the payload difference and the CRC with the TBCC to obtain the codeword. This codeword is denoted as $\Delta C2$. The value $\Delta C2$ is the difference between the codeword C1 generated by the eNB for frame t+1 and the codeword C0 generated by the eNB for frame t.

The UE then combines the computed LLRs for payload P1 with the computed LLRs for payload P2 by taking into account the payload difference between payload P2 and payload P1. The UE may obtain 120 code bits for codeword $\Delta C2$, with each code bit having a binary value of either '0' or '1'. The UE adjusts the sign/polarity of each computed LLR for payload P1 based on the corresponding code bit in codeword $\Delta C2$ (via multiplier 826). The UE may perform sign adjustment for each computed LLR for payload P1, as follows:

Flip the sign of the computed LLR for code bit k for payload P1 if code bit k in codeword $\Delta C2$ has a value of '1', or Retain the sign of the computed LLR for code bit k for payload P1 if code bit k in codeword $\Delta C2$ has a value of '0'.

The UE adjusts the computed LLRs for all 120 code bits (i.e., for 1<k<120) for payload P1 in a similar manner. Each code bit k with a value of '1' in codeword $\Delta C2$ may indicate code bit k for payload P1 being different from code bit k for payload P2. Hence, the computed LLR for code bit k for payload P1 may be flipped.

The LLR adjustment may also be viewed as scrambling of the LLRs based on the codeword difference. The LLR adjustment converts the computed LLRs for payload P1 into adjusted LLRs for payload P2. The UE then sums (with a binary operation) the adjusted LLRs for payload P2 with the computed LLRs for payload P2 to obtain combined LLRs for payload P2 (adder 836). The combined LLRs include the energy in the received PBCH transmission with payload P2 as well as the energy in the received PBCH transmission with payload P1. The UE decode the combined LLRs for payload P2 to obtain a decoded payload P2 (block 838). The likelihood of correct decoding is higher due to the higher energy in the combined LLRs. The UE may perform CRC check to determine whether payload P2 is decoded correctly. If the answer is yes, then the UE terminates the decoding of the PBCH.

If the PBCH transmission in frame t+1 is still decoded in error, then the UE receives a PBCH transmission with payload P3 (e.g., MIB) in frame t+2 (block 852). The UE computes LLRs for code bits for payload P3 based on the received PBCH transmission (block 854). The LLRs for payload P3 are denoted as LLR3. The UE determines the difference between payload P3 and payload P2, which is denoted as $\Delta P3$ (block 842). The UE encodes the payload difference $\Delta P3$ to obtain a codeword $\Delta C3$ having 120 code bits (block 844).

The UE may then combine the combined LLRs for payload P2 with the computed LLRs for payload P3 by taking into account the payload difference between payload P3 and payload P2. The combined LLRs for payload P2 include the computed LLRs for payload P1 (LLR1) as well as the computed LLRs for payload P2 (LLR2). The UE may adjust the sign/polarity of each combined LLR for payload P2 based on the corresponding code bit in codeword $\Delta C3$, as described above (via multiplier 846). The sign adjustment converts the combined LLRs for payload P2 into adjusted LLRs for payload P3. The UE then sums the adjusted LLRs for payload P3 with the computed LLRs for payload P3 to obtain combined LLRs for payload P3 (adder 856). The combined LLRs for payload P3 include the total energy in the three received PBCH transmissions for payloads P1, P2 and P3. The UE decodes the combined LLRs for payload P3 to obtain a decoded payload P3 (block 858). The UE may perform CRC check to determine whether payload P3 is decoded correctly. If the answer is yes, then the UE may terminate the decoding of the PBCH. If payload P3 is decoded in error, then the UE receives the next PBCH transmission and may repeat the LLR combine and decode process.

As shown in FIG. 8, the UE saves the latest combined LLRs (or the computed LLRs for the first PBCH transmission) when a PBCH transmission is decoded in error. The UE adjusts and combines the saved LLRs with the computed LLRs for the next PBCH transmission to obtain new combined LLRs having more energy. The higher energy improves the likelihood of correctly decoding the PBCH transmission. The UE combine LLRs for as many PBCH transmissions as desired until one is decoded correctly. The UE may save only one set of combined LLRs, which includes the computed LLRs for all PBCH transmissions decoded in error.

The UE determines the difference between two payloads that change infrequently (e.g., MIBs) and uses the payload difference to combine LLRs for the two payloads. The payload difference is determined based on the known structure and characteristics of the payloads.

Unlike the MIB, the system frame number (SFN) changes from one PBCH transmission to the next. In a synchronized network, all eNBs have the same frame timing and the same SFN. The UE may be able to obtain the SFN of the current frame from any eNB. The UE computes the SFN for the next frame by incrementing the known SFN for the current frame by one. The UE may determine the entire payload for the next frame by (i) using the computed SFN for the next frame and (ii) assuming that the MIB and reserved bits will not change in the next frame. The payload difference may then include (i) zeros for the MIB and the reserved bits and (ii) the difference between the computed SFN for the next frame and the known SFN for the current frame. The payload difference may be processed (e.g., attached with a CRC and encoded) to obtain code bits used for LLR adjustment, as described above.

If the network is asynchronous, the UE may not know the SFN of the current frame. In one embodiment, the UE performs LLR combining and decoding for all possible SFN differences. If the SFN is incremented by one in each frame, then eight SFN differences are possible and are shown in Table 1. The values in Table 1 are given in binary, and each x may be either '0' or '1'.

TABLE 1

| SFN Difference | Scenario |
| --- | --- |
| 00000001 | SFN going from xxxxxxx0 to xxxxxxx1 |
| 00000011 | SFN going from xxxxxx01 to xxxxxx10 |
| 00000111 | SFN going from xxxxx011 to xxxxx100 |
| 00001111 | SFN going from xxxx0111 to xxxx1000 |

TABLE 1-continued

| SFN Difference | Scenario |
| --- | --- |
| 00011111 | SFN going from xxx01111 to xxx10000 |
| 00111111 | SFN going from xx011111 to xx100000 |
| 01111111 | SFN going from x0111111 to x1000000 |
| 11111111 | SFN going from 01111111 to 10000000 |

The UE performs LLR combining and decoding for each possible SFN difference. The UE then determines whether a given SFN difference is correct based on the CRC check.

The UE may assume the same values for the MIB and reserved bits, as described above. In another embodiment, the UE assumes a reserved bit being used (i.e., varying across frames) and may then perform LLR combining and decoding for two hypotheses—one hypothesis for the reserved bit not changing across frames and another hypothesis for the reserved bit changing across frames. The UE may also assume multiple reserved bits being used and may perform LLR combining and decoding for each possible difference for the used reserved bits.

In general, the UE may perform blind decoding and determine all possible payload differences or hypotheses based on the structure and characteristics of the payload. The UE performs LLR combining and decoding for each possible payload difference and may check whether the decoding is correct or in error for that payload difference based on the CRC check. The UE evaluates more hypotheses if more bits of the payload are unknown and can change.

Figure 9:
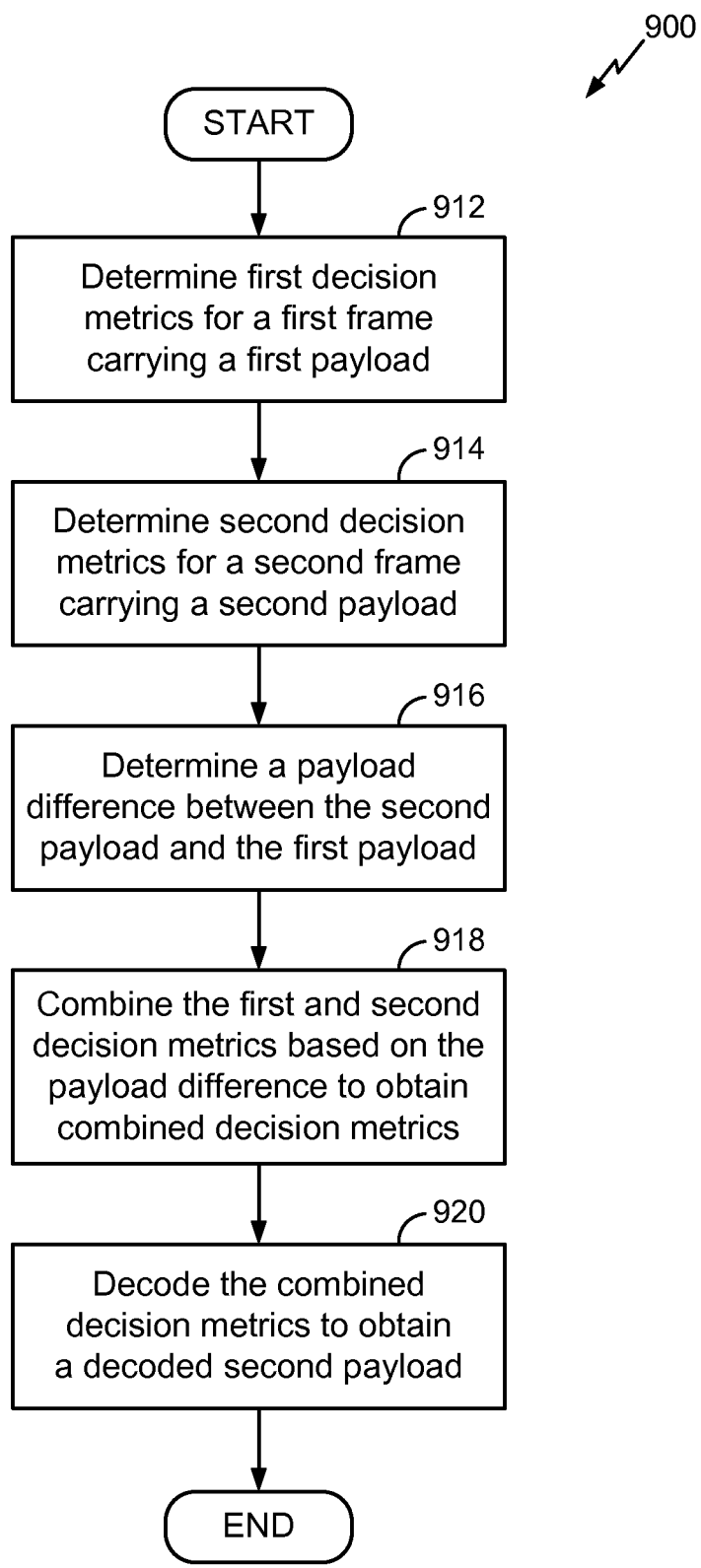
FIG. 9 is a block diagram conceptually illustrating a process for performing decoding in a communication system according to one aspect of the present disclosure.

FIG. 9 shows a design of a process 900 for performing decoding in a communication system. The process 900 may be performed by a receiver, which may be part of a UE, a base station/eNB, or some other entity. The receiver may determine first decision metrics (e.g., LLR1) for a first received transmission carrying a first payload (e.g., P1) (block 912). The receiver determines second decision metrics (e.g., LLR2) for a second received transmission carrying a second payload (e.g., P2) (block 914). The first and second payloads may include system information and/or other types of information. The first and second received transmissions may be for the PBCH or some other channel. The receiver determines a payload difference (e.g., ΔP2) between the second payload and the first payload (block 916). The receiver combines the first and second decision metrics based on the payload difference to obtain combined decision metrics (e.g., ΔC2) (block 918). The decision metrics may be LLRs for code bits or some other metrics for decoding. The receiver decodes the combined decision metrics to obtain a decoded second payload (block 920). The receiver may determine whether the second payload is decoded correctly based on a CRC attached to the second payload.

For block 916, the receiver may determine the payload difference based on known structure and characteristics of the payloads. In one embodiment, each payload is a first part (e.g., MIB and reserved bits) and a second part (e.g., SFN). The receiver may determine the payload difference based on an assumption of (i) no change in the first part of the first and second payloads and (ii) the second part having a known variation (e.g., incrementing by one) from the first payload to the second payload. In another embodiment, the first and second payloads include a part having multiple possible differences between the first and second payloads (e.g., if the SFN is not known and/or if reserved bits are used). Multiple possible payload differences may be determined based on the multiple possible differences for the part. The receiver repeats the process (e.g., determines the payload difference, combines the decision metrics, and decodes the combined decision metrics) for each possible payload difference until the second payload is decoded correctly or all possible payload differences have been evaluated.

In one embodiment of block 918, the receiver processes the payload difference in the same manner as performed at a transmitter to obtain code bits. The receiver generates a CRC for the payload difference. The receiver then encodes the payload difference and the CRC based on the same linear code used by the transmitter to encode the first payload and the second payload to obtain the code bits. The receiver adjusts the sign of the first decision metrics based on the code bits to obtain adjusted first decision metrics. For each code bit obtained for the payload difference, the receiver may (i) flip the sign of a first decision metric for that code bit if the code bit has a first value (e.g., '1') or (ii) retain the sign of the first decision metric if the code bit has a second value (e.g., '0'). The receiver then sums the adjusted first decision metrics and the second decision metrics to obtain the combined decision metrics.

In one embodiment, the receiver decodes the first decision metrics to obtain a decoded first payload. The receiver may determine the second decision metrics, determine the payload difference, combine the first and second decision metrics, and decode the combined decision metrics in block 914 to 920 when the first payload is decoded in error.

In another embodiment, if the second payload is decoded in error, then the receiver determines third decision metrics (e.g., LLR3) for a third received transmission carrying a third payload (e.g., P3). The receiver determines a second payload difference (e.g., ΔP3) between the third payload and the second payload. The receiver combine the third decision metrics and the combined decision metrics based on the second payload difference to obtain second combined decision metrics (e.g., ΔC3). The receiver then decodes the second combined decision metrics to obtain a decoded third payload. The receiver may repeat the process if the third payload is decoded in error.

In one configuration, the UE 120/eNB 110 configured for wireless communication includes means for determining first decision metrics, means for determining second decision metrics, and means for determining a payload difference between the second payload and the first payload. The UE/120/eNB 110 may also include means for combining the first and second decision metrics, and means for decoding. In one aspect, the aforementioned means may be the processor (s), the controller/processor 480, the memory 482, the receive processor 458, the MIMO detector 456, the demodulators 454a, and the antennas 452a configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 8-FIG. 9 may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    determining first decision metrics for a first frame carrying a first payload;
    determining second decision metrics for a second frame carrying a second payload;
    determining a payload difference between the second payload and the first payload;
    combining the first and second decision metrics based on the payload difference to obtain combined decision metrics; and
    decoding the combined decision metrics to obtain a decoded second payload.

2. The method of claim 1, wherein the first and second decision metrics comprise log-likelihood ratios (LLRs) for code bits.

3. The method of claim 1, wherein the combining the first and second decision metrics comprises:
    modifying the first decision metrics based on the payload difference to obtain adjusted first decision metrics, and
    combining the adjusted first decision metrics and the second decision metrics to obtain the combined decision metrics.

4. The method of claim 3, comprising:
    encoding at least the payload difference based on a linear code used to encode the first payload and the second payload to obtain code bits.

5. The method of claim 4, wherein the encoding at least the payload difference comprises:
    generating a cyclic redundancy check (CRC) for the payload difference, and
    encoding the payload difference and the CRC based on the linear code used to encode the first payload and the second payload to obtain the code bits.

6. The method of claim 2, wherein the modifying comprises,
    adjusting a sign of the first decision metrics for each code bit obtained for the payload difference by flipping the sign of a first decision metric for the code bit when the code bit has a first value, and retaining the sign of the first decision metric for the code bit when the code bit has a second value.

7. The method of claim 1, wherein each payload comprises a first part and a second part, and wherein the determining the payload difference comprises
    determining the payload difference based on an assumption of no change in the first part of the first and second payloads and the second part being incremented by one from the first payload to the second payload.

8. The method of claim 7, wherein the second part comprises a system frame number (SFN).

9. The method of claim 1, wherein each payload comprises a first part and a second part, and wherein
the determining the payload difference comprises determining the payload difference based on an assumption of no change in the first part of the first and second payloads and the second part differing from the first payload to the second payload according to a limited subset of possible discrete patterns; and
the combining the first and second decision metrics, and the decoding the combined decision metrics are performed for each possible payload difference until the second payload is decoded correctly or all possible payload differences have been evaluated for the limited subset of possible discrete patterns.

10. The method of claim 1, further comprising:
determining third decision metrics for a third frame carrying a third payload;
determining a second payload difference between the third payload and the second payload;
combining the third decision metrics and the combined decision metrics based on the second payload difference to obtain second combined decision metrics; and
decoding the second combined decision metrics to obtain a decoded third payload.

11. The method of claim 1, further comprising:
decoding the first decision metrics to obtain a decoded first payload; and
performing the determining the second decision metrics, the determining the payload difference, the combining the first and second decision metrics, and the decoding the combined decision metrics when the first payload is decoded in error.

12. The method of claim 1, wherein the first and second frames are for a Physical Broadcast Channel (PBCH).

13. An apparatus for wireless communication, comprising:
means for receiving a first frame carrying a first payload and a second frame carrying a second payload; and
means for determining first decision metrics for the first frame carrying the first payload, for determining second decision metrics for the second frame carrying the second payload, for determining a payload difference between the second payload and the first payload, for combining the first and second decision metrics based on the payload difference to obtain combined decision metrics, and for decoding the combined decision metrics to obtain a decoded second payload.

14. The apparatus of claim 13, wherein the first and second decision metrics comprise log-likelihood ratios (LLRs) for code bits.

15. The apparatus of claim 13, wherein each payload comprises a first part and a second part, and wherein
the determining the payload difference comprises determining the payload difference based on an assumption of no change in the first part of the first and second payloads and the second part differing from the first payload to the second payload according to a limited subset of possible discrete patterns; and
the combining the first and second decision metrics, and the decoding the combined decision metrics are performed for each possible payload difference until the second payload is decoded correctly or all possible payload differences have been evaluated for the limited subset of possible discrete patterns.

16. An apparatus for wireless communication, comprising:
at least one processor; and
a memory coupled to the at least one processor, the at least one processor being configured:
to determine first decision metrics for a first frame carrying a first payload;
to determine second decision metrics for a second frame carrying a second payload;
to determine a payload difference between the second payload and the first payload;
to combine the first and second decision metrics based on the payload difference to obtain combined decision metrics; and
to decode the combined decision metrics to obtain a decoded second payload.

17. The apparatus of claim 16, wherein the first and second decision metrics comprise log-likelihood ratios (LLRs) for code bits.

18. The apparatus of claim 16, in which the at least one processor is configured:
to modify the first decision metrics based on the payload difference to obtain adjusted first decision metrics, and
to combine the adjusted first decision metrics and the second decision metrics to obtain the combined decision metrics.

19. The apparatus of claim 18, in which the at least one processor is configured:
to encode at least the payload difference based on a linear code used to encode the first payload and the second payload to obtain code bits.

20. The apparatus of claim 16, wherein each payload comprises a first part and a second part, and in which the at least one processor is configured:
to determine the payload difference based on an assumption of no change in the first part of the first and second payloads and the second part being incremented by one from the first payload to the second payload.

21. The apparatus of claim 16, wherein each payload comprises a first part and a second part, and in which the at least one processor is configured:
to determine the payload difference based on an assumption of no change in the first part of the first and second payloads and the second part differing from the first payload to the second payload according to a limited subset of possible discrete patterns; and
to perform the combining the first and second decision metrics, and the decoding the combined decision metrics for each possible payload difference until the second payload is decoded correctly or all possible payload differences have been evaluated for the limited subset of possible discrete patterns.

22. The apparatus of claim 16, in which the at least one processor is configured:
to determine third decision metrics for a third frame carrying a third payload;
to determine a second payload difference between the third payload and the second payload;
to combine the third decision metrics and the combined decision metrics based on the second payload difference to obtain second combined decision metrics; and
to decode the second combined decision metrics to obtain a decoded third payload.

23. A non-transitory computer-readable medium storing computer executable instructions, for carrying out when executed by a processor, a process comprising:
determining first decision metrics for a first frame carrying a first payload, determining second decision metrics for a second frame carrying a second payload, determining a payload difference between the second payload and the first payload, combining the first and second decision metrics based on the payload difference to obtain combined decision metrics, and decoding the combined decision metrics to obtain a decoded second payload.

24. The non-transitory computer-readable medium of claim 23, wherein the first and second decision metrics comprise log-likelihood ratios (LLRs) for code bits.

25. The non-transitory computer-readable medium of claim 23, in which the process comprises:

modifying the first decision metrics based on the payload difference to obtain adjusted first decision metrics, and combining the adjusted first decision metrics and the second decision metrics to obtain the combined decision metrics.

26. The non-transitory computer-readable medium of claim 25, in which the process comprises:

encoding at least the payload difference based on a linear code used to encode the first payload and the second payload to obtain code bits.

27. The non-transitory computer-readable medium of claim 23, wherein each payload comprises a first part and a second part, and in which the process comprises:

determining the payload difference based on an assumption of no change in the first part of the first and second payloads and the second part being incremented by one from the first payload to the second payload.

28. The non-transitory computer-readable medium of claim 23, wherein each payload comprises a first part and a second part, and in which the process comprises:

determining the payload difference based on an assumption of no change in the first part of the first and second payloads and the second part differing from the first payload to the second payload according to a limited subset of possible discrete patterns; and performing the combining the first and second decision metrics, and the decoding the combined decision metrics for each possible payload difference until the second payload is decoded correctly or all possible payload differences have been evaluated for the limited subset of possible discrete patterns.

29. The non-transitory computer-readable medium of claim 23, in which the process comprises:

determining third decision metrics for a third frame carrying a third payload;

determining a second payload difference between the third payload and the second payload;

combining the third decision metrics and the combined decision metrics based on the second payload difference to obtain second combined decision metrics; and decoding the second combined decision metrics to obtain a decoded third payload.

* * * * *